United States Patent [19]

Stalemark

[11] 4,314,101
[45] Feb. 2, 1982

[54] REMOTE SUPERVISING APPARATUS

[75] Inventor: Ragnar F. Stalemark, Westport, Conn.

[73] Assignee: Camil P. Spiecens, New York, N.Y.

[21] Appl. No.: 102,031

[22] Filed: Dec. 10, 1979

[51] Int. Cl.³ .......................................... H04M 11/06
[52] U.S. Cl. ............................. 179/2 A; 179/1 MN; 179/1 VC
[58] Field of Search ................. 179/2 R, 2 A, 2 AM, 179/5 R, 5 P, 1 MN, 6 E, 1 VC; 340/148

[56] References Cited
U.S. PATENT DOCUMENTS 3,891,802  6/1975  Bartelink ........................... 179/2 A
4,016,360  4/1977  Cane ................................... 179/2 A

*Primary Examiner*—Bernard Konick
*Assistant Examiner*—J. A. Popek
*Attorney, Agent, or Firm*—Hane, Roberts, Spiecens & Cohen

[57] ABSTRACT

Apparatus for remotely supervising via a telephone line a device includes a sensor for sensing for a telephone ring signal from the telephone line. In response to the sensing of the ring signal there is generated an off-hook condition which causes the termination of the ring signal. In addition an indicator responsive to the sensor produce a melody continuously repeated with an interval between each transmitted melody. This repeated melody is transmitted to the telephone line for counting by the caller. In addition, within the apparatus, a counter counts the melodies as they are produced. A key memory connected to the counter and responsive to the telephone line is activated when a predetermined count has been counted by the counter and there is a voice signal on the line from the caller. The operation of this key memory alerts a control circuit for the reception of subsequent voice signals which permit the changing of state of a controlled device.

10 Claims, 2 Drawing Figures

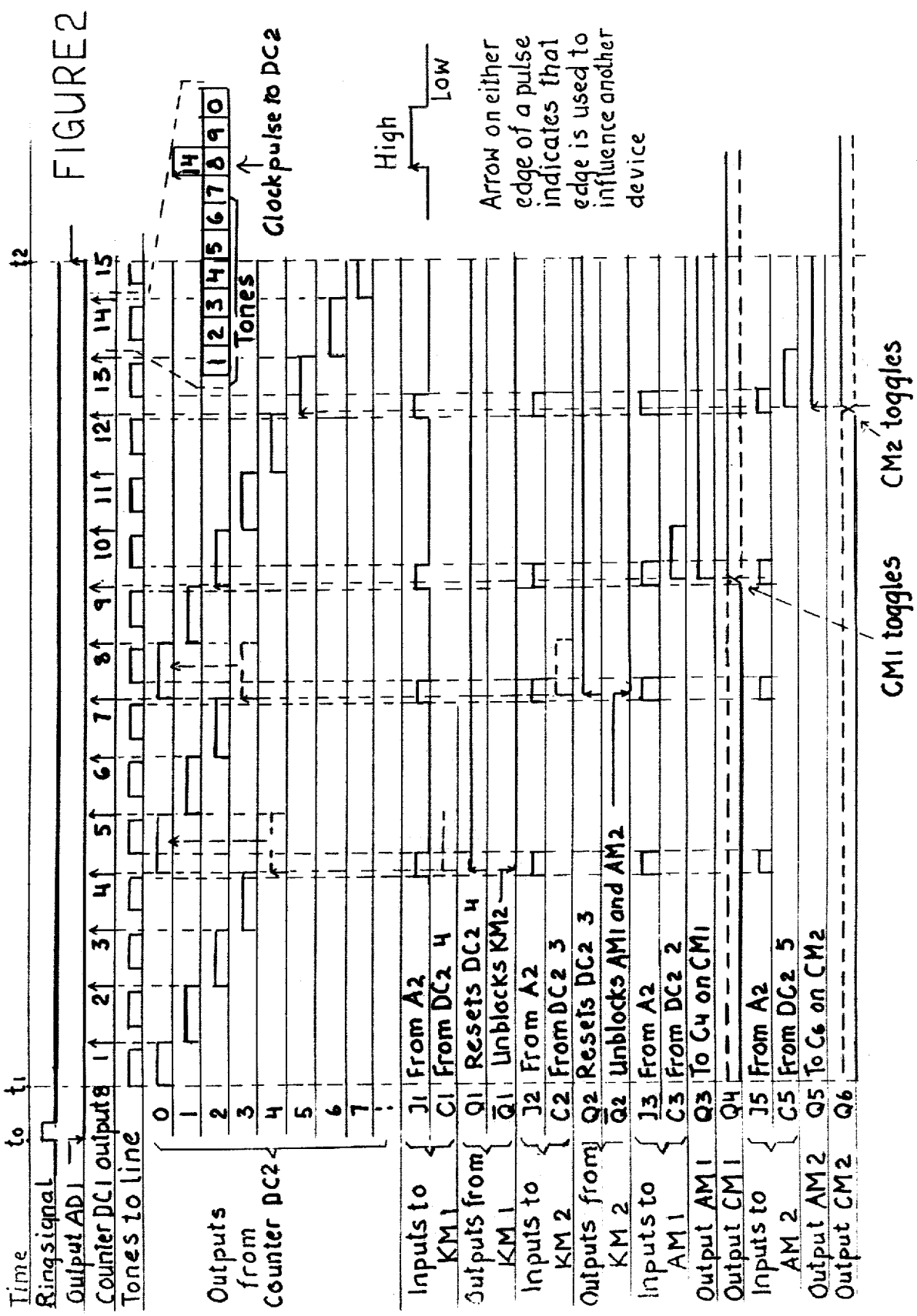

REMOTE SUPERVISING APPARATUS

BACKGROUND OF THE INVENTION

This invention pertains to remote supervising apparatus and more particularly to apparatus for remotely supervising devices via a telephone line.

There have been proposed numerous methods and apparatus for controlling via a telephone line electrical contacts or the like installed at a remote location. These contacts can be used to start or stop, for instance, equipment, air-conditioners, lighting, etc. In order to avoid unauthorized or inadvertent operation of such devices it has been suggested that the user place two sequential calls with a time interval between such calls. The receiving equipment is designed to react only for that time interval. Along the same lines there has been suggested the placing of two calls with each call being terminated after a predetermined number of ring signals. In this way it is possible to provide a two-digit number which can be recognized by electronic or electromechanical equipment at the remote location. However, these methods and apparatus require that the ring signals the caller hears be synchronized with the ones that are actually sent out by the remote control equipment. Since this is not always true, such a method becomes useless. In addition, both of these methods suffer from a very serious drawback apart from being both impractical and time consuming. In particular since the telephone calls only result in unanswered ring signals, there is no base for charging the use of a telephone circuit being provided by the telephone company. Hence, such equipment would not be permitted to be attached to the public telephone network controlled by the telephone companies.

There is also known a solution to the problem which does not suffer from the above-mentioned drawbacks. In such a system the ring signal initiates the operation of a motor driven timing device which is programmed to permit the ring signals to continue for 30 seconds. At the end of that time, a low resistance is connected to the line causing the ring signal to stop. At the same time information is provided to the telephone station for billing purposes. During the following 30 seconds the caller hears nothing and it is expected that an accidental or unauthorized call will hand up during that period. At the end of that period the timing devices operates the relay which performs the desired operation and sends a confirming signal back. However, no supervision is provided and it takes a considerable time to complete just one maneuver. Therefore, if a caller should leave his phone off the hook an undesired operation takes place.

Finally, there has been proposed in U.S. Pat. No. 3,049,592 a method for controlling terminal equipment utilizing stepping relays and requiring the transmission of combinations of signals and no-signals to effect the control. Not only is the apparatus for this system expensive and complicated but the actual procedures required of the user lend themselves readily to errors.

BRIEF SUMMARY OF THE INVENTION

It is a general object of the invention to provide apparatus for simply and reliably supervising remote devices through the agency of a telephone line.

Briefly, the apparatus contemplates the remote supervision of a device via a telephone line. The apparatus includes sensing means for sensing for a telephone ring signal from the telephone line. There are means responsive to the sensing means for simulating an off-hook condition in order to terminate the telephone ring signal. Indicating means responsive to the sensing means produce a melody continuously repeated with an interval between each melody generated and each of which is at least a single tone signal. These melodies are transmitted to the telephone line, while at the same time counting means count the melodies as they are produced. When the caller hears these melodies he counts them in synchronism with the counting means and utters a sound or breath when a predetermined count is reached. At the other end of the line key memory means connected to the counting means record the voice status signal of the line when such predetermined count has been counted by the counting means and the caller. A control means responsive to the key memory means emits a signal which changes the condition of the device if the key memory means recorded the presence of a voice signal on the telephone line when the predetermined count occurred. If there is no voice signal at that time because the caller did not utter one then the state of the device remains the same.

BRIEF DESCRIPTION OF THE DRAWING

Other objects, the features and advantages of the invention will be apparent from the following detailed description when read in conjunction with the accompanying drawing which show by way of example and not limitation the presently preferred embodiment of the invention. In the drawing:

FIG. 2 is a switching process diagram in the time domain, which is useful in explaining the operation of the apparatus of FIG. 1.

DETAILED DESCRIPTION OF THE PREFERRED EMBODIMENT

Figure 1:
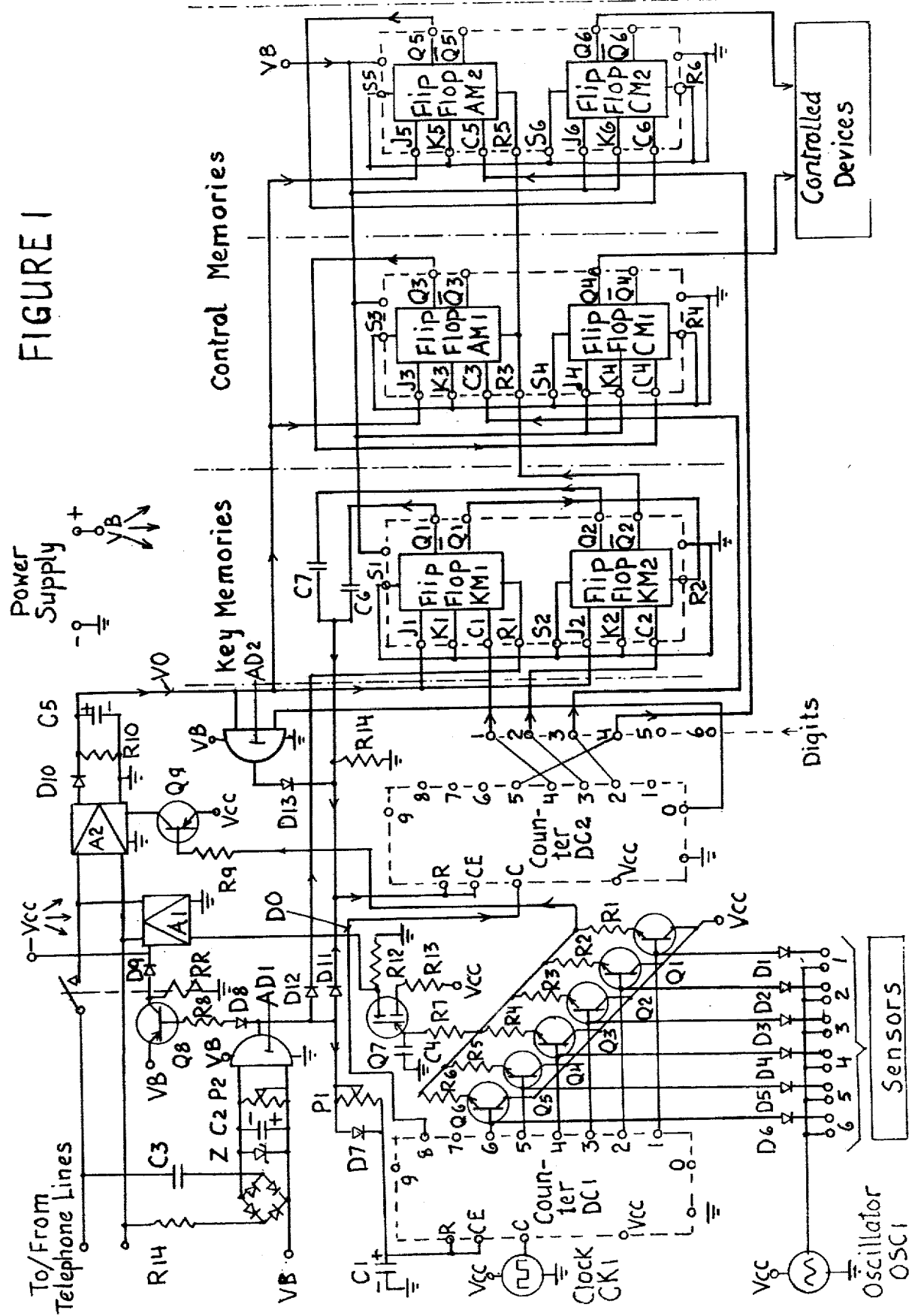
FIG. 1 is a circuit diagram of the apparatus for supervising a device remotely.

The supervising apparatus of the invention, as shown in FIG. 1 comprises: an interface network with the telephone line; a melody generator connected to the device sensors and connected to a sequence counter; and a set of memories interconnected between the sequence counter and the devices being controlled or supervised.

The interface circuits include the rectifier array comprising the resistor bridge RB connected via the resistor R14 and the capacitor C3 across the telephone line. The output terminals of the bridge are connected to the parallel combination of the Zener diode Z, the capacitor C2 and the potentiometer P2 as well as input to the AND-circuit AD1.

The output of the AND-circuit AD1 is connected to the base electrode of the transistor Q8 via the diode D8 and resistor R8 in series. The transistor Q8 acts as a switching transistor to apply operating power to the major portions of the system. In particular, the emitter electrode of the transistor is connected to the terminal $V_B$ of the power supply while its collector electrode is connected via the diode D9 to the terminal $V_{cc}$. In addition, the collector electrode is connected to the winding of the relay RR whose contacts are in series with one of the lines of the pair of telephone lines. The interface also include a transmitting amplifier A1 which receives signals from the melody generator and feeds them across the telephone lines. Finally, the interface includes a receiving amplifier A2 connected across the telephone lines and having a rectifier output including the diode D10, the resistor R10 and the filter capacitor C5.

The melody generator includes the controlled free-running counting means comprising the clock CK1 driving the decade counter DC1. The decade counter has outputs labelled 0 through 9. The outputs 1 through 6 are respectively connected to the base electrodes of the transistors Q1 through Q6. In addition, each of the base electrodes is respectively connected via the associated diodes D1 to D6 to one input of each of the sensors (the other input of each of the sensors is connected to the oscillator OSC1). Each of the sensors can be considered as a contact set. If the contact set is closed the low frequency signal of the oscillator, say about ten to twenty Hertz is connected to the base electrode of the associated transistor. Otherwise there is no connection to such oscillator. The emitter electrodes of the transistors Q1 to Q6 are respectively connected via resistors R1 to R6 in parallel to one end of the resistor R7 of an oscillator RC circuit including the capacitor C4. The RC circuit is connected to the gate electrode of the unijunction transistor Q7 having its reference electrode connected via the resistor R13 to the voltage source $V_{cc}$ and having an output electrode connected to the ground resistor R12 and the input of the amplifier A1 in the interface equipment. It should be noted that each of the resistors R1 to R6 can have a different value. When the free-running counter is operating the transistors Q1 to Q6 are sequentially activated and sequentially different resistors are connected into the RC circuit. For each resistance the circuit oscillates at a different frequency so that in the present example six different tone signals can be generated. For various reasons the tone signals should not be spread over the entire audio band of 300 to 3400 Hz to avoid possible interference with signalling tone used in the telephone network. It is quite adequate to use only three different tones to form a number of "melodies". This means that only 3 different values of resistors R1 to R6 are needed (which could include the value 0 ohm).

To make observation of the tone sequence easier two consecutive tones should always be of different frequency. For example the notes c, d, and e, will only occupy a frequency range of from about 480 to 680 Hz and can generate 96 different tone sequences of 6 notes with adjacent tones of different frequency. (The number of tones does not of course have to be fix but it is found to be a convenient number to demonstrate the invention.)

It should be noted that in a simplified embodiment only using one tone frequency the free-running counter DC1 can be deleted and a single transistor can be used with the clock CK1 directly driving the base of this resistor. It will be recalled that the base electrode of each of the transistors Q1 to Q6 is connected to one of the device sensors. If a device is in a given state then effectively the base electrode of the associated transistor is connected directly to the output of the oscillator OSC1. Thus when the transistor is activated the voltage on the base electrode is modulated by the signal from oscillator OSC1 and accordingly, the tone signal being generated will be modulated with respect to that frequency. Thus a modulated tone can be used as an indication of one the state of a device in the system whereas a steady tone indicates the other state.

It should be noted that the eighth output of the decade counter DC1 is connected via the line DO to the count input of the decade counter DC2. (It can be the seventh, eighth or ninth output. In the case of a single tone "melody" the leading edge of the pulse following the desired number of tones will be connected to the count input of DC2). The counter DC2 is the sequence counter which will now count the number of melodies generated by the melody generator. Outputs of this counter are connected to different memories according to step-by-step switching coding techniques which are hereinafter described.

The memories fall into two classes. The key memories comprising flip-flops KM1 and KM2 and the control memories having two channels one consisting of flip-flops AM1 and CM1 and the other consisting of flip-flops AM2 and CM2 which control the devices of the system.

Before the occurrence of the ring signal the power supply voltage $V_B$, energizes only the flip-flops of the memories and is applied to the emitter electrode of the transistor Q8 in the interface circuits. At that time the output of AND-circuit AD1 is high, blocking the transistor Q8 as well as charging the capacitor C1 to a high state. This high state effectively blocks the decade counter DC1. At time t0 the ring signal arrives on the telephone lines. This ring signal after detection effectively lowers at least one input of the AND-circuit AD1 causing its output to drop. Thus transistor Q8 conducts connecting the voltage $V_B$ to the voltage line $V_{cc}$. In addition this causes the energization of relay RR and the telephone lines are connected across the input of the amplifier A2. Since this amplifier has a low DC input impedance a low DC impedance is connected across the lines. This simulates the equivalent of removing the hand set from the hook of a telephone in other words there is a simulation of the off-hook condition (that is with the telephone being "picked up"). Consequently, the telephone station equipment responds to this condition by terminating the ringing. A short time thereafter, that is at time t1, determined by the timing circuit of potentiometer P1 and capacitor C1 the voltage to the enable inputs R-CE of the decade counter DC1 drops sufficiently low to permit the operation of this counter. (It should be noted that although the ring signal has stopped, the output of the AND-circuit AD1 still remains low because of the delay network comprising the potentiometer P2 the capacitor C2). The time constant of this circuit is chosen sufficiently long to permit repetition of the melody the desired number of times. With the enabling of the decade counter DC1 the clock CK1 starts stepping this counter through its sequences. Melodies are generated as described above by the oscillator and are fed from the transistor Q7 to the input of the amplifier A1 onto the telephone lines. These melodies are heard by the caller.

Now assigned to this device are two key digits. These digits permit access to the control circuits of the device. These digits plus either or both of the 3rd and 4th digit, can be considered the address of the device. By using two key digits—subject to certain restrictions—there is available over 300 combinations for access. This should be adequate for normal circumstances. If it is felt that even greater reliability or supervision is needed then one can go to three, four or more key digits. However, for the present case it will be assumed that the key digits are the values 4 and 3. It will be recalled that as each melody is generated it is followed by a pulse which steps the decade counter DC2. Since the decade counter DC2 is enabled at the time t0 i.e. on arrival of the ring signal the count in the decade counter DC2 will be in synchronism with the count of the melodies heard by the caller. When the caller hears the fourth melody he blows into his mouthpiece or makes a sound. This generates a voice signal fed along the telephone lines and received by the receiving amplifier A2. The voice signal is rectified and fed onto the line VO. (It should be noted that as long as the melodies are being generated the receiving amplifier A2 is blocked). Transistor Q9's base electrode is via resistor R9 connected to the connection point between resistors R1–R6 on one side and resistor R7 on the other. This point is essentially at the $V_{cc}$ level while the tones are generated and this keeps the base voltage of transistor Q9 high thus blocking the $V_{cc}$ voltage connected to its emitter from reaching amplifier A2's DC supply terminal. Thus the voice signal must be generated in the gap between melodies.

Since the decade counter DC2 is at the count of four, its four output is high and connected to the C1 input of the flip-flop KM1 whose J1 input at that time is also high as a result of the rectified voice signal. Consequently the flip-flop KM1 goes to the high state, the high signal on the Q1 output of the flip-flop is fed back through capacitor C6 to the reset input of the decade counter DC2 to cycle this counter back to a count of 0. In addition, the $\overline{Q1}$ output of the flip KM1 is fed to the R2 input of the flip-flop KM2 enabling this flip-flop to respond to signals. The melody generator still keeps repeating generating the melody and following the next third melody the caller again generates a voice signal. This time the decade counter DC2 is at its third state and emitting a signal from its three output to the C2 input of the flip-flop KM2. This flip-flop at this time is also receiving the second rectified voice signal on the line VO connected to its J2 input. Thus, the flip-flop KM2 memory is set.

When the flip-flop KM2 went to the low state its Q2 output fed via capacitor C7 to the reset input of the decade counter DC2 again clears this counter to zero. At the same time the $\overline{Q2}$ output of the flip-flop KM2 enables the flip-flops AM1 and AM2 of the control memories.

The caller now has access to controlling the states of the controlled devices. These devices are again given predetermined count numbers. In the present example these devices are given the count numbers 2 and 5. If the caller wishes to change the state of one of these devices, he then counts again the number of melodies and utters a voice signal at the desired count. If he wishes to change the state of both devices then he must do them in sequence, with the lower numbered device being changed first. In other words as can be seen from FIG. 2, he first makes the voice signal after the second melody and again after the fifth melody. In this case the decade counter DC2 is not cleared. Therefore, if the caller utters the voice signal at the end of the second count, there will be a coincidence of signals on the input J3 for the voice signal, the input C3 from the decade counter and the input R3 from the flip-flop KM2, and the flip-flop AM1 will set. The setting of the flip-flop AM1 causes a high signal on its output Q3 which is fed to the toggle input of the flip-flop CM1 causing it to change state. If at the end of the fifth melody the caller wishes to change the state of the second device he utters a voice signal causing the setting of the flip-flop AM2 and the toggling of the flip-flop CM2 in a similar manner.

Time thereafter, at the time T2 the capacitor C2 in the interphase circuit has completely discharged causing both inputs to the AND-gate AD1 to go high, resulting in the output of this circuit being high. Consequently, the transistor Q8 opens denying the operating voltage $V_{cc}$ to the decade counters, the block and the oscillator. In addition, the high voltage is fed via diode D12 to the R1 input of the flip-flop KM1 causing it to go to the zero state and raising its output $\overline{Q1}$ high. This high state is fed to the R2 input of the flip-flop KM2 causing it to go to the zero state and raising its output $\overline{Q2}$. The high voltage of the output $\overline{Q2}$ is fed to the inputs R3 and R5 of the flip-flops AM1 and AM2 respectively clearing them to the zero state. Thus the system is returned to its initial state awaiting another ring signal at a later time. It should be noted however, that the flip-flops CM1 and CM2 remain in whatever state they had been toggled to.

In order to prevent false operation of the apparatus as a result of a continuous tone on the line after a ring signal there is provided a two-input AND-circuit AD2 having inputs connected to the line VD and the O-output (home position) of decade counter DC2, and an output connected to the control inputs R and CE of said counter via diode D13. Thus if there is a steady tone on the line the counter DC2 will be locked to its home position. Also, if the counter DC2 had started counting when it reached the home position it would be locked in that position.

While only one embodiment of the invention has been shown and described in detail, there will now be obvious to those skilled in the art many modifications and variations satisfying many or all of the objects of the invention while not departing from the spirit thereof as defined by the appended claims.

What is claimed is:

1. Apparatus for remotely supervising, via a telephone line, a device comprising: sensing means for sensing for a telephone ring signal from the telephone line; means operative when said sensing means senses a telephone ring signal for simulating an off-hook condition in order to terminate the telephone ring signal; indicating means operative when said sensing means senses a telephone ring signal and after said off-hook condition is simulated for repeatedly producing a melody to form a series of melodies; said melody being at least one tone signal; means for transmitting said series of melodies to the telephone line; counting means for counting the melodies in the series as they are produced; key memory means connected to said telephone line and to said counting means for recording the presence or absence of a voice signal on the telephone line when a predetermined count has been counted by said counting means; and control means responsive to said key memory means for emitting a signal which changes the condition of the device if said key memory means recorded the presence of a voice signal on the telephone line when said predetermined count occurred.

2. The apparatus of claim 1 wherein said control means comprises control memory means activatable by said key memory means for changing state if another voice signal is on the telephone line for another predetermined count of said counting means.

3. The apparatus of claims 1 or 2, wherein said one tone signal is associated with the device and further comprising means for modulating said one tone signal in accordance with the condition of the device.

4. The apparatus of claim 2 further comprising clearing means responsive to the recording of the presence of a voice signal by said key memory means for recycling said counting means to count again from a base value.

5. The apparatus of claim 1 wherein said indicating means comprises generating means for generating a plurality of sets of sequentially occurring unique tone signals and a step signal associated with each of said sets, and means for transmitting said step signals to said counting means for counting thereby.

6. The apparatus of claim 5 wherein said generating means comprises: a freerunning counting means operable only for a given time interval following the sensing of a ring signal, an oscillator, and switching means controlled by said free-running counting means for changing the operative frequency of said oscillator.

7. The apparatus of claim 5 wherein said generating means comprises: a counting means having a plurality of sequentially energized outputs; an oscillator having a timing circuit including a capacitor and a resistor means; a plurality of resistors; and a plurality of switching means, each of said switching means being controlled by a different one of said sequentially energized outputs for operatively connecting a different one of said resistors to said resistor means.

8. The apparatus of claim 1 wherein said counting means has a plurality of sequentially energized outputs and said key memory means comprises a first bistable device having input means connected to one of said sequentially energized outputs and to the telephone line, said first bistable device switching to a first stable state at the coincidence of a voice signal on the telephone line and said one output being energized.

9. The apparatus of claim 8 wherein said first bistable device has an output means, and means connected to said output means for clearing said counting means to an initial starting value when said first bistable device is switched to said first stable state; and wherein said key memory means further comprises a second bistable device connected to one of said sequentially energized outputs and to the telephone line, said second bistable device switching to a first stable state at the coincidence of a voice signal on the telephone line and the output of said counting means connected thereto being energized while said first bistable device is in said first stable state.

10. The apparatus of claim 9 wherein said second bistable device has an output means, and means connected to said output means for clearing said counting means to an initial starting value when said second bistable device is switched to a second stable state; and wherein said control means comprises control memory means activatable by the coincidences of a predetermined count in said counting means, a voice signal on the telephone line and said second bistable device being in said first stable state.

* * * * *